No. 816,645. PATENTED APR. 3, 1906.
H. H. CLOUGH.
RAILWAY TIE PLATE AND MEANS FOR SECURING RAILS THERETO.
APPLICATION FILED MAR. 14, 1904.
4 SHEETS—SHEET 1.
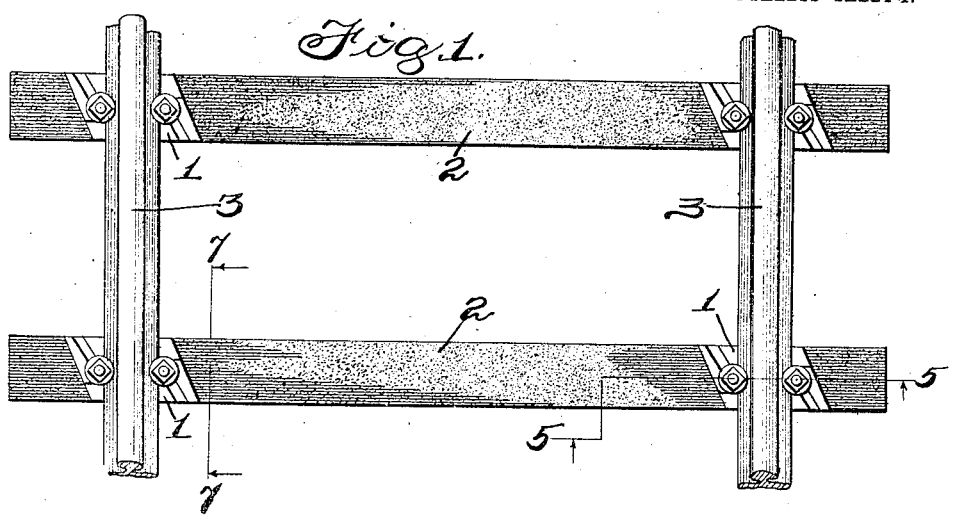
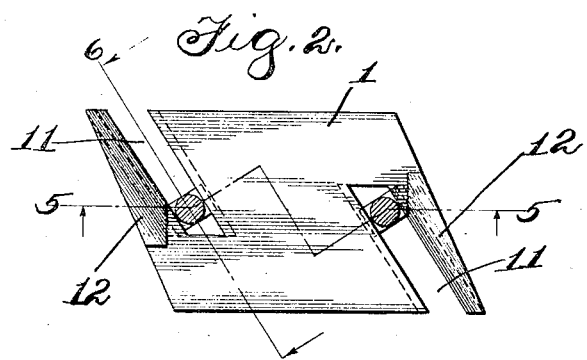
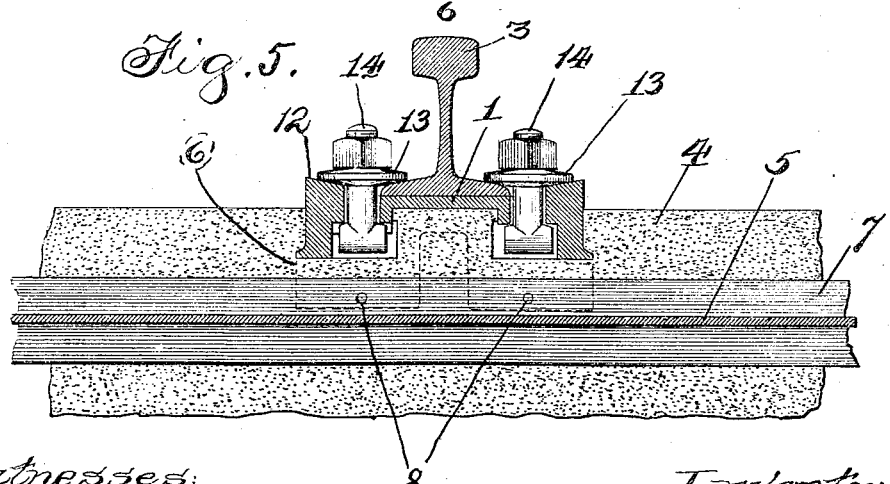
Witnesses:
J. B. Weir
Olis L. Plumtree
Inventor:
Henry H. Clough
by 

No. 816,645. PATENTED APR. 3, 1906.
H. H. CLOUGH.
RAILWAY TIE PLATE AND MEANS FOR SECURING RAILS THERETO.
APPLICATION FILED MAR. 14, 1904.
4 SHEETS—SHEET 2.
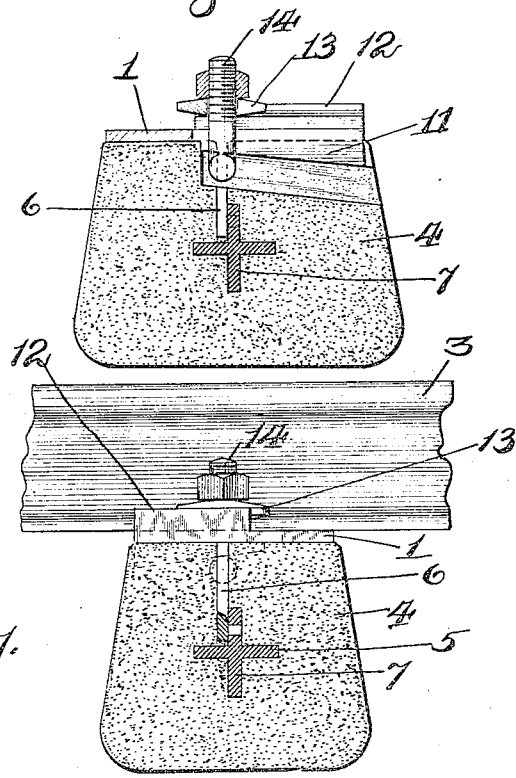
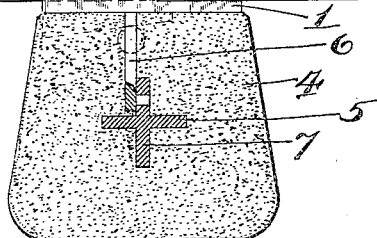
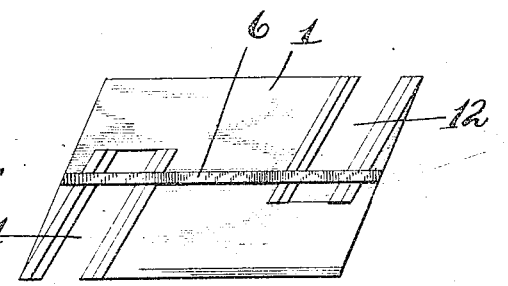
Witnesses:
J. B. Weir
Oliver T. Plummer
Inventor:
Henry H. Clough No. 816,645. PATENTED APR. 3, 1906.
H. H. CLOUGH.
RAILWAY TIE PLATE AND MEANS FOR SECURING RAILS THERETO.
APPLICATION FILED MAR. 14, 1904.
4 SHEETS—SHEET 3.
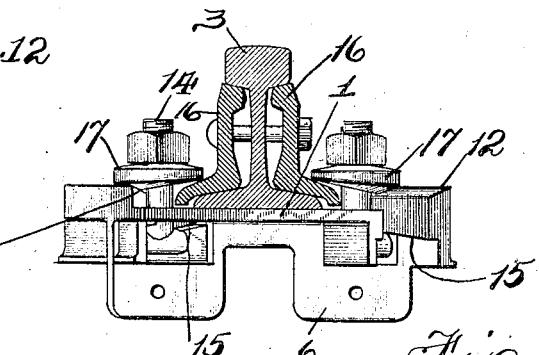
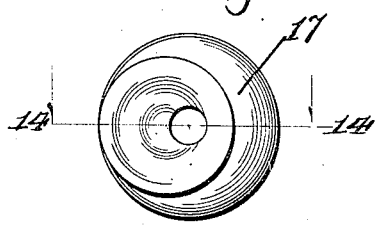
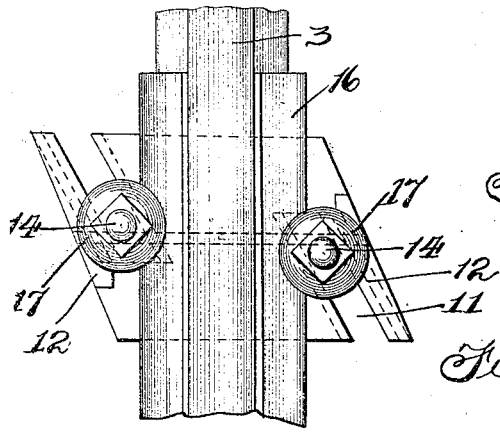
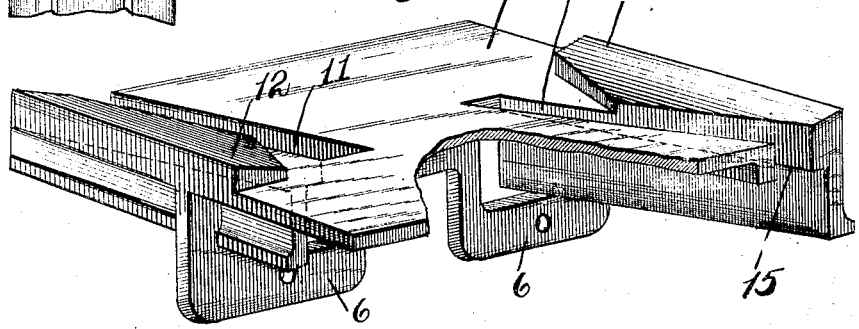
Witnesses:
J. B. Weir
Oliver T. Plumtree
Inventor:
Henry H. Clough No. 816,645. PATENTED APR. 3, 1906.
H. H. CLOUGH.
RAILWAY TIE PLATE AND MEANS FOR SECURING RAILS THERETO.
APPLICATION FILED MAR. 14, 1904.

4 SHEETS—SHEET 4.

Witnesses:
J. B. Weir
Oliver L. Plumtree

Inventor
Henry H. Clough
by

UNITED STATES PATENT OFFICE.

HENRY H. CLOUGH, OF ELYRIA, OHIO.

RAILWAY-TIE PLATE AND MEANS FOR SECURING RAILS THERETO.

No. 816,645.

Specification of Letters Patent.

Patented April 3, 1906.

Application filed March 14, 1904. Serial No. 197,965.

*To all whom it may concern:*

Be it known that I, HENRY H. CLOUGH, a citizen of the United States, and a resident of Elyria, Lorain county, Ohio, have invented certain new and useful Improvements in Railway-Tie Plates and Means for Securing a Rail Thereto, of which the following is a complete specification.

This invention relates to tie-plates of the kind adapted to be secured to the ties beneath the rails of railway-tracks.

The object of the invention is to provide means for securing the rails to the tie-plates, whereby the rails may be secured thereto independently of the means for securing the tie-plates to the ties, thus making provision for the use of tie-plates which are rigidly and permanently secured to the ties, forming, in effect, a unitary structure therewith.

To this end a tie-plate comprising rail-securing means of my invention consists of the various features, combinations of features, and details of construction hereinafter described and claimed.

In the accompanying drawings, a tie-plate and securing means of my invention are fully illustrated.

Figure 8:
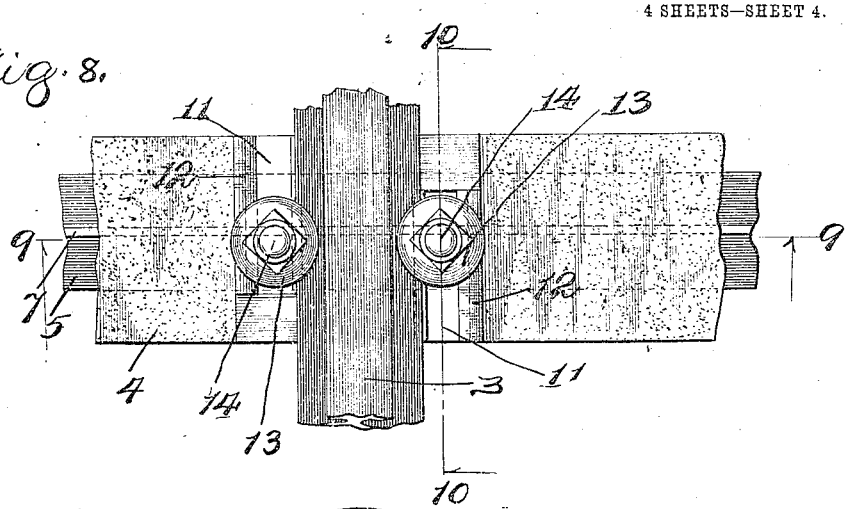
Figure 9:
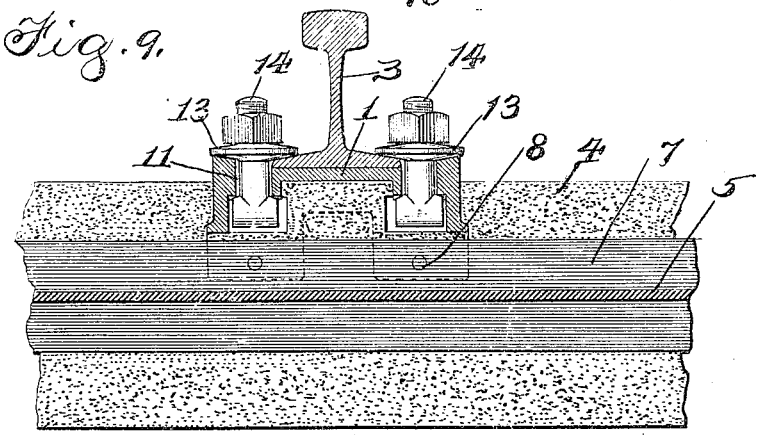
Figure 10:
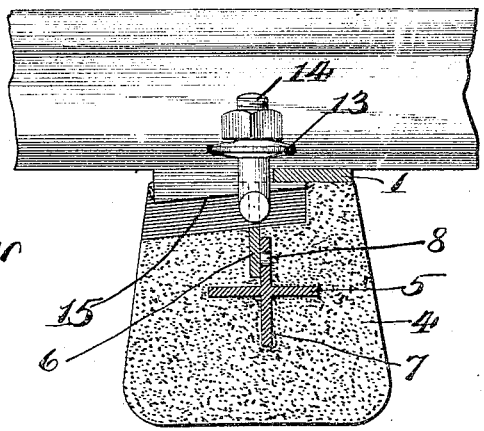

Figure 1 is a top plan view of a section of railway-track, the rails being secured to the tie-plates by means embodying my invention. Fig. 2 is a top plan view of the preferred form of tie-plate. Fig. 3 is a bottom plan view thereof. Fig. 4 is an enlarged perspective view thereof. Fig. 5 is a longitudinal sectional view of the structure of Fig. 1, taken on the line 5 5 of Fig. 2. Fig. 6 is a sectional view through a tie-plate and tie on the line 6 6 of Fig. 2. Fig. 7 is a sectional elevation on the line 7 7 of Fig. 1. Fig. 8 is a partial top plan view showing a modification of the means for securing the rails to the tie-plates. Figs. 9 and 10 are longitudinal sectional views on the lines 9 9 and 10 10, respectively, of Fig. 8; and Figs. 11 to 14, inclusive, are views of a further modification of the means for securing the rails to the tie-plates as adapted for use with angle bars or plates at rail-joints.

Referring now to the drawings, 1 designates a tie-plate of my invention, said tie-plate being shown in connection with the ties 2 and rails 3 of a railway-track. Any desired or approved form of tie may be used, and the tie-plates 1 may be secured thereto in any desired manner. As shown, the ties 2 consist of concrete body portions 4, embedded in which are metal bars 5, which extend substantially the entire length thereof. As shown, also, said bars 5 are cross-shaped in section, comprising four webs extending upwardly, downwardly, and to both sides of the center thereof; but any other desired or approved form of bar may be used. As shown, also, the tie-plates 3 are secured to the ties by means of webs or flanges 6, formed on the under sides thereof, which extend downwardly beyond the upwardly-extending flanges 7 of the bars 5 and are connected thereto by means of lugs 8 on the webs or flanges 6, which engage suitable holes or openings formed in the flanges 7 of said bars 5, said webs or flanges 6 on said tie-plates being likewise embedded in the concrete body portions 4 of said ties.

A railway-tie constructed in accordance with the foregoing description, together with tie-plates secured thereto in the manner described, is made the subject-matter of a separate application for Letters Patent filed by me in the United States Patent Office concurrently herewith and numbered serially 197,964, and is for that reason not herein claimed.

With tie-plates of my invention the rails 3 are designed and adapted to be secured thereto independently of the means for securing said tie-plates to the ties. As shown, the rails 3 are secured to the tie-plates 1 in the following manner: Formed in the tie-plates 1 are slots 11, which extend inwardly from the sides of said plates. Each plate is preferably provided with a slot 11 at each side of the rail-seat thereon, said slots extending inwardly from opposite sides of said plates; but my invention contemplates equally the use of tie-plates each having a slot at one side only of the rail-seat, a succession of plates, however, comprising slots on different sides of the rail-seat. Formed on the upper surfaces of the tie-plates 1, at the sides of the slots 11 remote from the rail-seats thereon, are raised portions 12, which are of substantially the same height as the thickness of the bases or flanges of the rails. The bases of the rails are clamped in position upon the tie-plates 3 by means of clamping-bars 13, the inner ends of which bear upon the bases of the rails and the outer ends upon the raised portions 12 of the tie-plates. Bolts 14, the heads of which are secured in the slots 11 and which extend upwardly through suitable holes in the clamping-bars, operate to draw said clamping-bars into engagement with the bases of the rails. As shown, the upper surfaces of the raised portions 12 of the tie-plates 1 decline downwardly and inwardly at substantially the same angle as the tops of the rail-bases decline downwardly and outwardly, and the under surfaces of the clamping-bars 13, which engage therewith, are correspondingly inclined upwardly and outwardly. With this construction it is obvious that the inclination of the tops of the raised portions 12 of the tie-plates 1 will balance or neutralize the tendency of the clamping-bars 13 to slip off from the bases of the rails, owing to the slant of the upper surfaces thereof, and that said clamping-bolts 14 will thus operate to draw said clamping-bars into strong engagement with the bases of said rails. As shown, said clamping-bars 13 are made in the form of washers, the under surfaces of which are beveled oppositely to and at the same angle as the upper surfaces of the raised portions 12 of said tie-plates.

In order to prevent the heads of the bolts 14 from working out of the slots 11, the dimensions of the tie-plates from the lower edges of said slots to the tops of the raised portions 12 decrease from the outer ends of said slots inwardly. As shown at 15, this is effected by inclining the lower edges of said slots upwardly toward the inner ends thereof at a slight angle relatively to the tops of the raised portions 12 of the tie-plates at the edges of said slots.

In order to adapt tie-plates of my invention for use with rails having bases of different widths, the slots 11 preferably extend obliquely to the rail-seats, the space between the raised portions 12 being large enough to receive the widest rail-base designed to be used in connection therewith and the inner ends of said slots extending inwardly beyond the edges of the narrowest rail-base designed to be used therewith, all as clearly shown in Figs. 1 to 7 and 11 and 12, inclusive. The use of oblique slots also renders it possible to adjust the clamping-bolts into close proximity to the edges of the rails, whether the same be wide or narrow, thereby causing the clamping-bars to exert the greatest possible leverage upon the bases of the rails when said clamping-bolts are tightened to secure the rails in position. My invention, however, contemplates equally the use of slots, which extend parallel with the rail-seats, as shown in Figs. 8 to 10, inclusive.

The tie-plates 2 may be made of any suitable cast metal; but to insure adequate strength and reasonable cost of production I prefer to make them either of cast-steel or malleable iron.

In Figs. 12 to 14, inclusive, of the drawings I have shown my improved securing means modified for use at rail-joints in connection with angle-plates 16, which join the ends of the rails. The said modification consists in the use of clamping-bars or washers 17, which are thicker at their outer ends than at their inner ends, so that their inner ends will engage the surfaces of said angle-bars in substantially the same relation as the clamping bars or washers 13 engage the bases of the rails at points away from the joints. As shown, also, the thickened outer ends of said clamping bars or washers 17 are beveled or inclined to conform to the inclination of the upper surfaces of the raised portions 12 of the tie-plates 3.

While I have herein shown but one method of securing the rails to the plates, I do not desire to limit myself to the specific means shown, as said means may be modified in various ways, and in another application filed in the Patent Office concurrently herewith, Serial No. 197,966, to which reference is made, other means for this purpose are shown.

I claim as my invention—

1. The combination with a tie-plate, of means for securing a rail thereto, said means comprising a slot formed in said tie-plate and disposed outside of the rail-seat thereon, a raised portion on said tie-plate at the side of said slot remote from the rail-seat, a clamping-bar and a clamping-bolt, substantially as described.

2. The combination with a tie-plate, of means for securing a rail thereto, said means comprising a slot formed in said tie-plate, which extends obliquely to the rail-seat, a raised portion on said tie-plate at the side of said slot remote from the rail-seat, a clamping-bar and a clamping-bolt, substantially as described.

3. The combination with a tie-plate, of means for securing a rail thereto, said means comprising a slot formed in said plate, a raised portion on said tie-plate at the side of said slot remote from the rail-seat, said raised portion being of substantially the same length as said slot, a clamping-bar and a clamping-bolt secured in the slot in said tie-plate applied to said clamping-bar, substantially as described.

4. The combination with a tie-plate, of means for securing a rail thereto, said means comprising a slot formed in said tie-plate, which extends obliquely to the rail-seat, a raised portion on said tie-plate at the side of said slot remote from the rail-seat and of substantially the same length as said slot, clamping-bars and clamping-bolts secured in said slots applied thereto, substantially as described.

5. The combination with a tie-plate, of means for securing a rail thereto, said means comprising a slot formed in said tie-plate, a raised portion on said tie-plate at the side of the slot therein remote from the rail-seat, clamping-bars and clamping-bolts secured in said slots applied thereto, the upper surface of the raised portion of said tie-plate being inclined downwardly and inwardly and the outer end of the clamping-bar designed to engage therewith, being correspondingly inclined upwardly and outwardly, substantially as described.

6. The combination with a tie-plate, of means for securing a rail thereto, said means comprising a slot formed in said tie-plate, a raised portion on said tie-plate at the side of said slot remote from the rail-seat, a clamping-washer and a clamping-bolt applied thereto, substantially as described.

7. The combination with a tie-plate, of means for securing a rail thereto, said means comprising a slot formed in said tie-plate, a raised portion on said tie-plate at the side of said slot remote from the rail-seat, a clamping-washer and a clamping-bolt secured in the slot in said tie-plate applied thereto, the upper surface of the raised portion of said tie-plate being inclined downwardly and inwardly and the under side of said clamping-washer being inclined or beveled upwardly and outwardly, substantially as described.

8. The combination with a tie-plate, of means for securing a rail thereto, said means comprising a slot formed in said tie-plate, a raised portion on said tie-plate at the side of said slot remote from the rail-seat, a clamping-bar and a clamping-bolt applied thereto, the head of said clamping-bolt bearing against the lower edges of the slot in said tie-plate, and the dimensions of said tie-plate from the lower edge of the slot therein to the upper surface of the raised portion of said tie-plate decreasing inwardly from the side of said plate, substantially as described.

9. The combination with a tie-plate, of means for securing a rail thereto, said means comprising a slot formed in said tie-plate, a raised portion on said tie-plate at the side of said slot remote from the rail-seat, a clamping-bar and a clamping-bolt applied thereto, the head of said bolt bearing against the lower edges of the slot in said tie-plate, and the lower edges of said slot being inclined upwardly and inwardly from the side of said plate relatively to the upper surface of the raised portion of said tie-plate, substantially as described.

10. The combination with a tie-plate, of means for securing a rail thereto, said means comprising slots formed in said tie-plate and disposed outside of the rail-seat thereon, raised portions on said tie-plate at the sides of said slot remote from the rail-seat, clamping-bars and clamping-bolts secured in said slots applied to said clamping-bars, substantially as described.

11. The combination with a tie-plate, of means for securing a rail thereto, said means comprising slots formed in said tie-plate and disposed outside of the rail-seat thereon, raised portions on said tie-plate at the sides of said slots remote from the rail-seat, clamping-bars and clamping-bolts secured in said slots applied to said clamping-bars, said clamping-bars being thicker at their outer ends than at their inner ends, substantially as described.

12. A railway-tie formed of composition, a securing-plate in the body of the tie, and devices for adjustably securing the rail to said plate; substantially as and for the purpose specified.

In testimony that I claim the foregoing as my invention I affix my signature, in presence of two subscribing witnesses, this 10th day of February, A. D. 1904.

H. H. CLOUGH.

Witnesses:
 HENRY W. CARTER,
 K. A. COSTELLO.